(12) United States Patent
Ushigome et al.

(10) Patent No.: US 12,152,932 B2
(45) Date of Patent: Nov. 26, 2024

(54) OPTICAL SENSOR DEVICE

(71) Applicant: DENSO CORPORATION, Kariya (JP)

(72) Inventors: Naoya Ushigome, Kariya (JP); Tomoko Sakamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/339,315

(22) Filed: Jun. 22, 2023

(65) Prior Publication Data
US 2023/0332943 A1    Oct. 19, 2023

Related U.S. Application Data

(63) Continuation of application No. PCT/JP2022/001287, filed on Jan. 17, 2022.

(30) Foreign Application Priority Data

Feb. 17, 2021   (JP) .................. 2021-023266

(51) Int. Cl.
*G01J 1/04* (2006.01)
*B60S 1/08* (2006.01)
*G01J 1/42* (2006.01)

(52) U.S. Cl.
CPC ........... *G01J 1/0411* (2013.01); *B60S 1/0837* (2013.01); *G01J 2001/4266* (2013.01)

(58) Field of Classification Search
CPC ............. G01J 1/0411; G01J 2001/4266; B60S 1/0822; B60S 1/0833; B60S 1/0837
See application file for complete search history.

(56) References Cited

U.S. PATENT DOCUMENTS

| | | | |
|---|---|---|---|
| 7,468,523 B2* | 12/2008 | Ishikawa | B60S 1/0888 250/575 |
| 2006/0006318 A1* | 1/2006 | Ishikawa | B60S 1/0822 250/227.25 |
| 2017/0067776 A1 | 3/2017 | Makino | |

FOREIGN PATENT DOCUMENTS

JP    2021-015082 A    2/2021

* cited by examiner

*Primary Examiner* — Kevin K Pyo
(74) *Attorney, Agent, or Firm* — Posz Law Group, PLC

(57) ABSTRACT

An optical sensor device includes a plurality of light-emitting elements arranged on an arrangement surface to be apart from each other in an x direction perpendicular to a z direction that is a direction connecting an area corresponding to the plurality of light-emitting elements and an area corresponding to a light-receiving element. A light-guide lens portion includes a plurality of incident portions respectively corresponding to the plurality of light-emitting elements and respectively receiving light from the plurality of light-emitting elements. The plurality of incident portions is provided with an equalizing portion configured to equalize intensity of the light incident on the light-guide lens portion along the x direction by reducing the intensity of the light along the z direction out of the light that is emitted from the light-emitting element, while allowing an incident of part of the light emitted from the light-emitting element adjacent to the corresponding light-emitting element.

6 Claims, 8 Drawing Sheets

OPTICAL SENSOR DEVICE

CROSS REFERENCE TO RELATED APPLICATION

The present application is a continuation application of International Patent Application No. PCT/JP2022/001287 filed on Jan. 17, 2022, which designated the U.S. and claims the benefit of priority from Japanese Patent Application No. 2021-023266 filed on Feb. 17, 2021. The entire disclosures of all of the above applications are incorporated herein by reference.

TECHNICAL FIELD

The present disclosure relates to an optical sensor device.

BACKGROUND

Conventionally, an optical sensor device including a rain sensor and a solar radiation sensor has been proposed.

The optical sensor device has a light-emitting element, a light-receiving element, and a light-guide lens portion as constituent members of the rain sensor. The light-guide lens portion is an optical component that guides the light emitted from the light-emitting element to a windshield of a vehicle, and guides a reflected light reflected by the windshield to a detection surface of the light-receiving element. The light-receiving element detects an intensity of the reflected light guided by the light-guide lens portion. In such manner, an amount of raindrops adhering to the windshield is detected.

Moreover, the optical sensor device has a solar radiation detection element and a solar radiation lens portion as constituent members of the solar radiation sensor. The solar radiation lens portion is an optical component that guides sunlight to a detection surface of the solar radiation detection element. The solar radiation lens portion has an emission surface that emits solar radiation light to the solar radiation detection element. The solar radiation detection element detects an intensity of solar radiation light emitted from the emission surface.

SUMMARY

According to a first aspect of the present disclosure, an optical sensor device includes a rain sensor. The rain sensor includes a plurality of light-emitting elements, a light-receiving element, and a light-guide lens portion.

The plurality of light-emitting elements may be disposed on an arrangement surface. The plurality of light-emitting elements are arranged apart from each other in an x direction perpendicular to a z direction that is a direction connecting an area corresponding to the plurality of light-emitting elements and an area corresponding to the light-receiving element on the arrangement surface.

The light-guide lens portion includes a plurality of incident portions. The plurality of incident portions corresponds to the plurality of light-emitting elements, respectively, and receive incident light from the plurality of light-emitting elements, respectively.

The plurality of incident portions are provided with an equalizing portion. The equalizing portion is configured to equalize the intensity of the light incident on the light-guide lens portion along the x direction, by reducing the intensity of the incident light along the z direction among the light that is emitted from the corresponding light-emitting element, while allowing an incident of part of the light emitted from the light-emitting element adjacent to the corresponding light-emitting element.

According to a second aspect of the present disclosure, an optical sensor device includes a solar radiation sensor. The solar radiation sensor includes a solar radiation detection element and a solar radiation lens portion. The solar radiation detection element receives solar radiation light incident on the windshield of the vehicle within a predetermined elevation angle range. The solar radiation lens portion guides the sunlight incident to the windshield to the solar radiation detection element. The solar radiation sensor is configured to detect an amount of solar radiation based on an intensity of solar radiation light received by the solar radiation detection element.

The solar radiation detection element is arranged on the arrangement surface. The solar radiation lens portion has an emission surface for emitting the solar radiation light to the solar radiation detection element.

A sectional direction (i.e., extension direction) is defined by a straight line that is a projection line of a section taken along a surface configuring an elevation angle of the solar radiation detection element, projected onto the arrangement surface. The emission surface has a protrusion. The protrusion protrudes or extends toward one direction, which is opposite to a relative movement of the light image of the solar radiation light projected on the arrangement surface, moving away from the solar radiation detection element.

BRIEF DESCRIPTION OF THE DRAWINGS

The above and other objects, features and advantages of the present disclosure are more clearly understood from the following detailed description with reference to the accompanying drawings. In the accompanying drawings.

DETAILED DESCRIPTION

Figure 1:
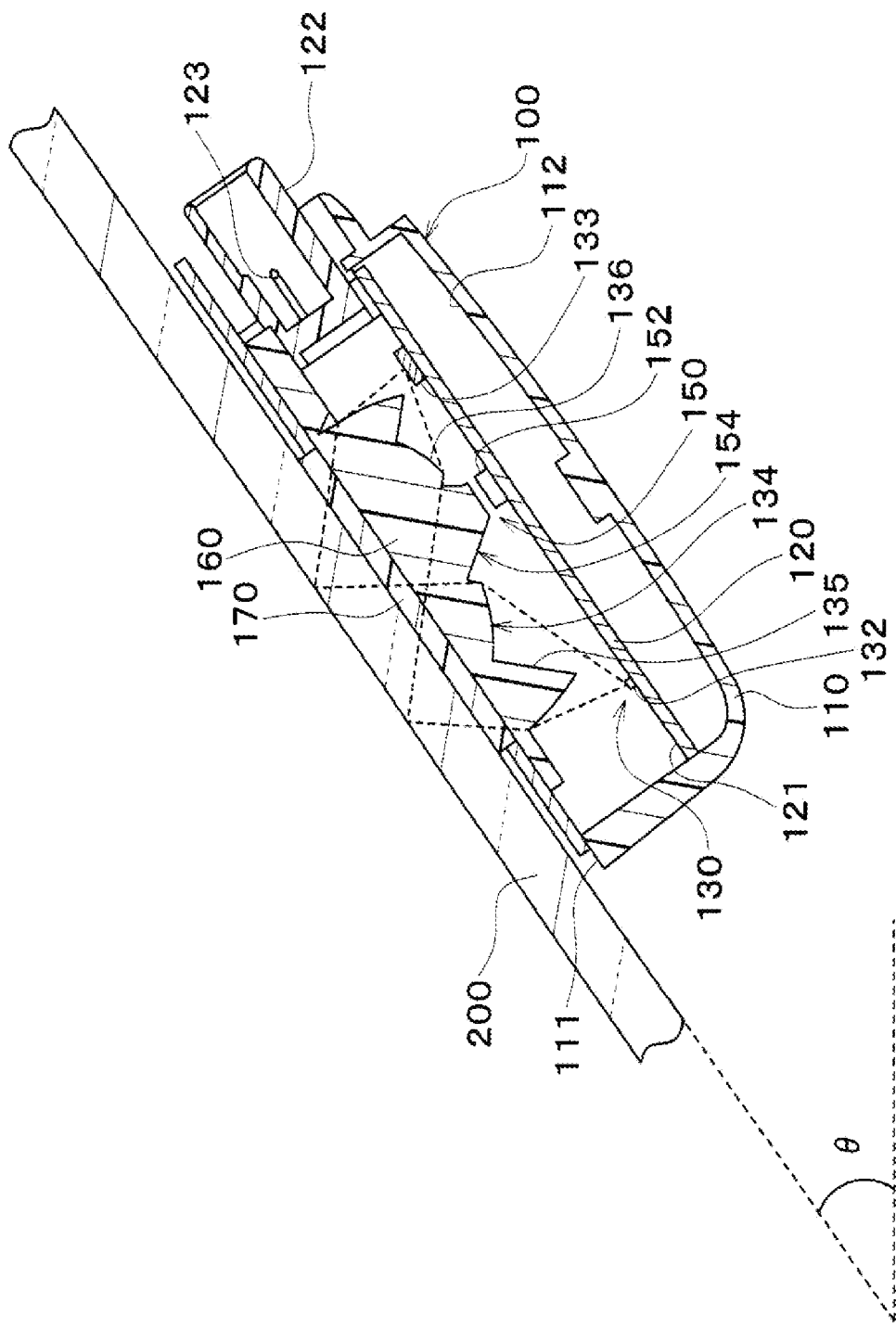
FIG. 1 is a cross-sectional view of an optical sensor device according to an embodiment.

In a rain sensor, if a detection range of a detection surface of a light-receiving element becomes narrow, there is a possibility that a detection accuracy of an amount of reflected light lowers.

The reason for the above is that light emitted from a light-emitting element tends to pass through a central portion of a light-guide lens portion disposed near the light-emitting element, and scarcely passes through end portions of the light-guide lens portion. In other words, an amount of parallel light passing through end portions of the light-guide lens portion tends to be smaller than an amount of parallel light passing through the central portion thereof.

Therefore, it becomes difficult to detect changes in the amount of light at a portion of the detection surface of the light-receiving element that detects the reflected light that has passed through the end portions of the light-guide lens portion. As a result, the detection range of the detection surface of the light-receiving element becomes narrow. Therefore, the detection accuracy of the amount of light lowers, and there is a possibility that a small amount of raindrops cannot be detected.

Further, in a solar radiation sensor, a range of a light image irradiated from a solar radiation lens portion to a detection surface of a solar radiation detection element moves according to the change in an angle of the sunlight. Therefore, when the angle of the sunlight changes, the solar radiation light does not reach the solar radiation detection element. Thus, there is a possibility that the detection accuracy of the angle of sunlight and the amount of sunlight are degraded.

Therefore, it is necessary to enlarge the area of the emission surface of the solar radiation lens portion or the area of the detection surface of the solar radiation detection element. However, enlarging the area of the emission surface of the solar radiation lens portion or the area of the detection surface of the solar radiation detection element increases the cost of the optical sensor device, and causes increase in the size of the solar radiation detection element.

It is a first object of the present disclosure to provide an optical sensor device capable of widening a detectable range of a rain sensor. Further, it is a second object of the present invention to provide an optical sensor device capable of suppressing deterioration in detection accuracy even if the solar radiation detection element of the solar radiation sensor is inexpensive and miniaturized.

According to a first aspect of the present disclosure, an optical sensor device includes a rain sensor. The rain sensor includes a plurality of light-emitting elements, a light-receiving element, and a light-guide lens portion.

The plurality of light-emitting elements emits light toward a windshield of a vehicle. The light-receiving element receives reflected light reflected by the windshield. The light-guide lens portion guides light emitted from the plurality of light-emitting elements to the windshield, and guides reflected light to the light-receiving element. The rain sensor is configured to detect raindrops adhering to the windshield based on an intensity of reflected light received by the light-receiving element.

The plurality of light-emitting elements are disposed on an arrangement surface. The plurality of light-emitting elements are arranged apart from each other in an x direction perpendicular to a z direction that is a direction connecting an area corresponding to the plurality of light-emitting elements and an area corresponding to the light-receiving element on the arrangement surface.

The light-guide lens portion includes a plurality of incident portions. The plurality of incident portions corresponds to the plurality of light-emitting elements, respectively, and receive incident light from the plurality of light-emitting elements, respectively.

The plurality of incident portions are provided with an equalizing portion. The equalizing portion is configured to equalize the intensity of the light incident on the light-guide lens portion along the x direction, by reducing the intensity of the incident light along the z direction among the light that is emitted from the corresponding light-emitting element, while allowing an incident of part of the light emitted from the light-emitting element adjacent to the corresponding light-emitting element.

According to the above, in the x direction, the intensity of light that tends to be received by the central portion among the plurality of incident portions can be weakened by the equalizing portion. Further, in the x direction, light that is scarcely received by the end portion(s) of each of the plurality of incident portions can be compensated by the light from the adjacent light-emitting element by using the equalizing portion.

Therefore, the intensity of light passing through an inside of the light-guide lens portion can be made even and equalized along the x direction, so that a range in which the intensity of light exceeding a threshold value for detecting raindrops can be widened in the x direction. Therefore, the detectable range of the rain sensor can be widened in the x direction.

According to a second aspect of the present disclosure, an optical sensor device includes a solar radiation sensor. The solar radiation sensor includes a solar radiation detection element and a solar radiation lens portion. The solar radiation detection element receives solar radiation light incident on the windshield of the vehicle within a predetermined elevation angle range. The solar radiation lens portion guides the sunlight incident to the windshield to the solar radiation detection element. The solar radiation sensor is configured to detect an amount of solar radiation based on an intensity of solar radiation light received by the solar radiation detection element.

The solar radiation detection element is arranged on the arrangement surface. The solar radiation lens portion has an emission surface for emitting the solar radiation light to the solar radiation detection element.

A sectional direction (i.e., extension direction) is defined by a straight line that is a projection line of a section taken along a surface configuring an elevation angle of the solar radiation detection element, projected onto the arrangement surface. The emission surface has a protrusion. The protrusion protrudes or extends toward one direction, which is opposite to a relative movement of the light image of the solar radiation light projected on the arrangement surface, moving away from the solar radiation detection element.

According to the above, even when the light image of the solar radiation light projected on the arrangement surface moves to the maximum distance relative to the solar radiation detection element, a part of the light image corresponding to the protrusion is irradiated on the detection surface of the solar radiation detection element. Therefore, even when the solar radiation detection element is inexpensive and miniaturized, a detection range equivalent to the one in which the protrusion is not provided on the emission surface is reservable. Therefore, even when the solar radiation detection element of the solar radiation sensor is inexpensive and miniaturized, it is possible to suppress deterioration in the detection accuracy of an amount of solar radiation.

Embodiments will be described with reference to the drawings. An optical sensor device according to an embodiment is, for example, an integrated device in which a rain sensor that detects raindrops adhering to the windshield of a vehicle and a solar radiation sensor that detects an amount of solar radiation around the vehicle are integrated.

As shown in FIG. 1, an optical sensor device 100 is installed on one side of a windshield 200, i.e., on a vehicle interior side. A shield angle θ of the windshield 200 is different according to vehicle types, i.e., different for vehicle to vehicle.

Figure 2:
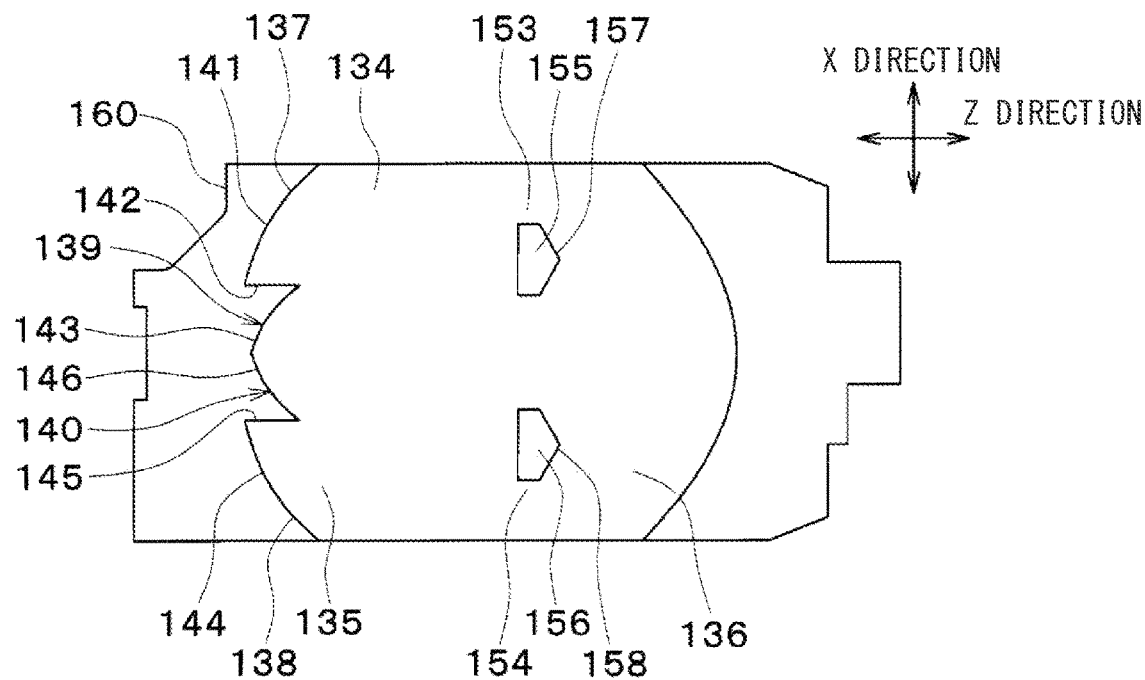
FIG. 2 is a plan view of a lens provided as an integrated device of a light-guide lens portion and a solar radiation lens portion.
Figure 3:
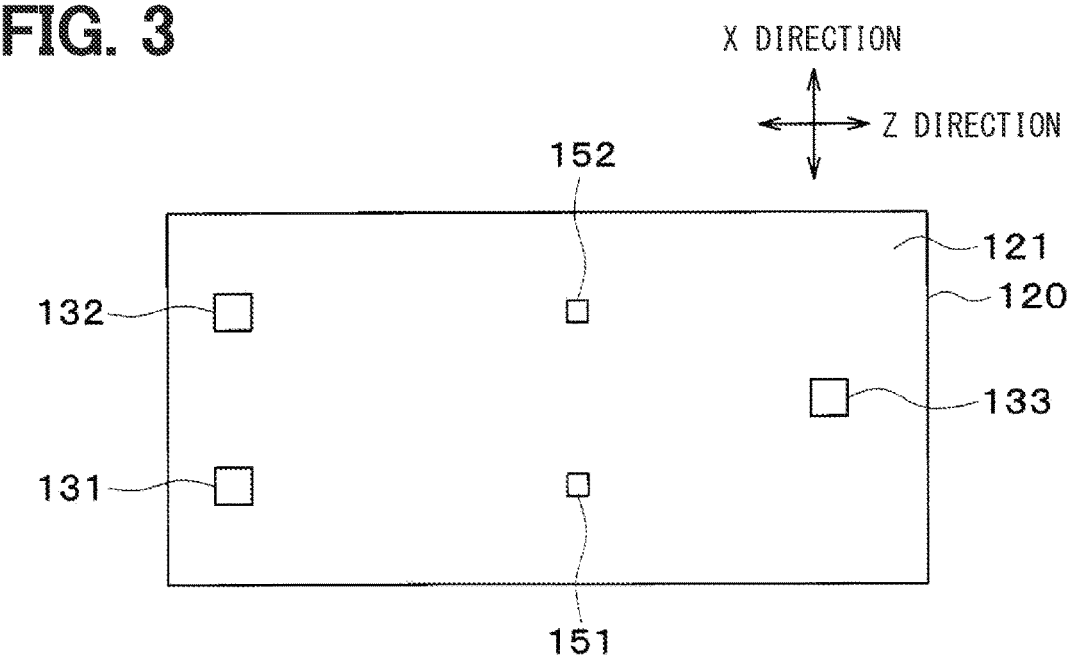
FIG. 3 is a plan view of an arrangement surface of a circuit board.

As shown in FIGS. 1 to 3, the optical sensor device 100 includes a cover housing 110, a circuit board 120, a rain sensor 130, and a solar radiation sensor 150. The rain sensor 130 includes a plurality of light-emitting elements 131 and 132, a light-receiving element 133, and a light-guide lens portion 134. The solar radiation sensor 150 includes a plurality of solar radiation detection elements 151, 152 and a plurality of solar radiation lens portions 153, 154.

The cover housing 110 is a housing for accommodating the circuit board 120, the rain sensor 130 and the solar radiation sensor 150. The cover housing 110 is made of metal material or resin material. The planar shape of the cover housing 110 is, for example, a square shape, when being viewed from an open end 111 side to a bottom 112 side.

The cover housing 110 is attached to a bracket (not shown) fixed to the windshield 200. Thereby, the cover housing 110 constitutes a container together with the bracket. The bracket is formed by pressing a metal plate into a predetermined shape, for example. The bracket is fixed to the windshield 200 with an adhesive or the like.

The circuit board 120 is a component on which the light-emitting elements 131 and 132 and the light-receiving element 133 of the rain sensor 130 are attached and the solar radiation detection elements 151 and 152 of the solar radiation sensor 150 are attached. The circuit board 120 is a plate-like component having an arrangement surface 121. The circuit board 120 is, for example, a printed-circuit board.

A connector 122 and electronic components (not shown) are mounted on the arrangement surface 121 of the circuit board 120. The connector 122 is a connecting part made of resin to which a wiring connector (not shown) is connected. The connector 122 has terminals 123 electrically connected to a circuit formed on the circuit board 120. The terminals 123 are insert-molded into the connector 122. Electronic components are, for example, IC chips, resistance elements, chip capacitors, and the like. The circuit board 120 is accommodated in the cover housing 110 on a side of the bottom 112, with the arrangement surface 121 facing the open end 111 of the cover housing 110.

The rain sensor 130 is a raindrop detection device configured to detect raindrops adhering to the windshield 200 of the vehicle. The optical sensor device 100 is a device obtained by integrating the solar radiation sensor 150 and the rain sensor 130. That is, the cover housing 110 and the circuit board 120 that constitute the optical sensor device 100 are components that constitute the rain sensor 130.

The plurality of light-emitting elements 131 and 132 are light-emitting devices that irradiate measurement light for detecting raindrops adhering to the windshield 200. In the present embodiment, the rain sensor 130 has two light-emitting elements 131 and 132.

Each of the light-emitting elements 131, 132 includes a light-emitting diode that emits light toward the windshield 200, and a drive circuit (not shown) that drives the light-emitting diode. The light-emitting diode is a point light source. The drive circuit, for example, PWM-controls the light-emitting diode. That is, the drive circuit turns on and off the light-emitting diode with a pulse signal. Of course, the light-emitting diode may be driven with a constant voltage.

Further, each of the light-emitting elements 131, 132 is configured as a semiconductor chip, for example. Also, each of the light-emitting elements 131, 132 may include a light-emitting diode only, having the drive circuit provided separately.

Each of the light-emitting elements 131, 132 is mounted on the arrangement surface 121 of the circuit board 120. Here, a direction connecting (a) an area corresponding to the plurality of light-emitting elements 131, 132 and (b) an area corresponding to the light-receiving element 133 on the arrangement surface 121 of the circuit board 120 is defined as the z direction. Also, a direction perpendicular to the z direction on the arrangement surface 121 is defined as the x direction. The z direction and the x direction are directions parallel to the arrangement surface 121 of the circuit board 120. The light-emitting elements 131, 132 are arranged with a space interposed therebetween along the x direction.

The light-receiving element 133 is a light-receiving device that receives light reflected by the windshield 200. The light-receiving element 133 includes a photodiode that detects received light and a processing circuit (not shown) that amplifies a signal corresponding to an intensity of the light detected by the photodiode. The light-receiving element 133 is mounted on the arrangement surface 121 of the circuit board 120 reserving a predetermined distance from each of the light-emitting elements 131, 132.

Further, the light-receiving element 133 is configured as, for example, a semiconductor chip. Also, the light-receiving element 133 may be made only of a photodiode, with the processing circuit provided separately.

The light-guide lens portion 134 is an optical component configured to (a) guide the light emitted from each of the light-emitting elements 131, 132 to the windshield 200 and (b) guide the light reflected by the windshield 200 to the light-receiving element 133. The light-guide lens portion 134 includes a first lens portion 135 and a second lens portion 136. The first lens portion 135 is a portion of the light-guide lens portion 134 that collects the light emitted from each of the light-emitting elements 131, 132 and converts the light into parallel light.

The first lens portion 135 is accommodated in the cover housing 110 to face the light-emitting elements 131, 132. The second lens portion 136 is a portion that collects light reflected by the windshield 200 onto the light-receiving element 133. The second lens portion 136 is accommodated in the cover housing 110 to face the light-receiving element 133.

In the above configuration, the light emitted from each of the light-emitting elements 131, 132 is guided to the windshield 200 through the first lens portion 135 of the light-guide lens portion 134 and reflected by the windshield 200. Also, the light reflected by the windshield 200 is guided to the light-receiving element 133 via the second lens portion 136 of the light-guide lens portion 134. According to the above, raindrops adhering to the windshield 200 change light refraction characteristics of the windshield 200, thereby the intensity of light detected by the light-receiving element 133 changes. Therefore, the rain sensor 130 detects that raindrops have adhered to the windshield 200 based on the relationship between the intensity of light received by the light-receiving element 133 and a threshold value.

The solar radiation sensor 150 is a solar radiation amount detection device configured to detect an amount of solar radiation. A plurality of solar radiation detection elements 151 and 152 are configured to receive solar radiation light incident on the windshield 200 within a predetermined elevation angle range. In the present embodiment, the solar radiation sensor 150 includes two solar radiation detection elements 151 and 152.

Each of the solar radiation detection elements 151, 152 is arranged on the arrangement surface 121 of the circuit board 120. Each of the solar radiation detection elements 151, 152 is arranged apart from each other in the x direction. Each of the solar radiation detection elements 151, 152 is arranged at a position between the light-emitting elements 131, 132 and the light-receiving element 133 of the rain sensor 130 on the arrangement surface 121 of the circuit board 120.

Each of the solar radiation detection elements 151, 152 includes a photodiode that detects an intensity of the received solar radiation light, a processing circuit (not shown) that acquires an amount of solar radiation based on a signal corresponding to an intensity of solar radiation light detected by the photodiode. Each of the solar radiation detection elements 151 and 152 may be configured as, for example, a semiconductor chip. Further, each of the solar radiation detection elements 151, 152 may be made only of a photodiode, with the processing circuit separately provided.

The solar radiation lens portions 153 and 154 are optical components that guide the solar radiation light incident on the windshield 200 within a predetermined elevation angle range to the respective solar radiation detection elements 151, 152. The solar radiation lens portion 153, one of the two such elements, is accommodated in the cover housing 110 to face the solar radiation detection element 151, i.e., one of the two such elements. The other solar radiation lens portion 154 is accommodated in the cover housing 110 to face the other solar radiation detection element 152. Each of the solar radiation lens portions 153, 154 is arranged at a position between the first lens portion 135 and the second lens portion 136 that constitute the light-guide lens portion 134 in the z direction. Each of the solar radiation lens portions 153, 154 is configured line-symmetrically with respect to the z direction.

Figure 4:
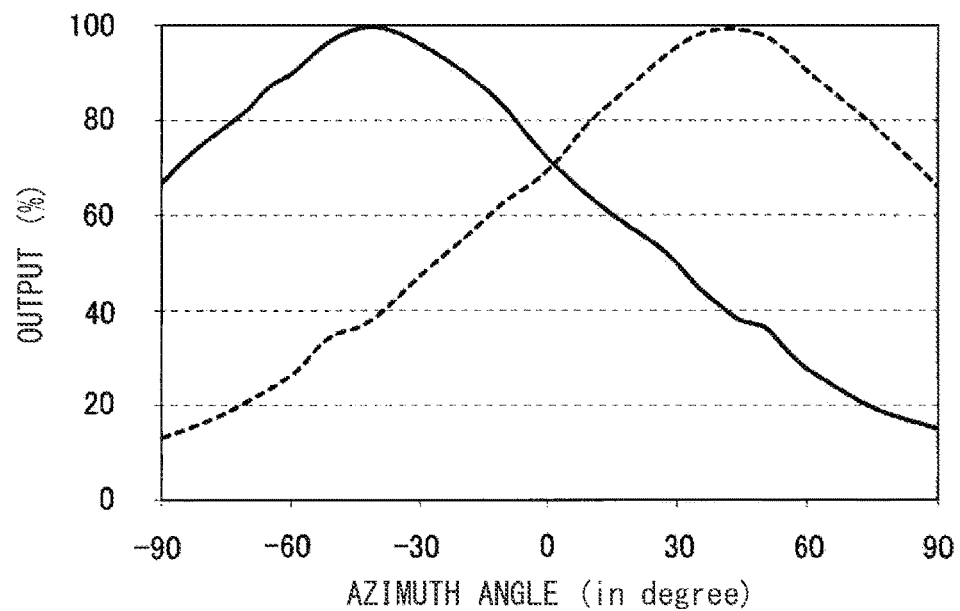
FIG. 4 is a diagram of azimuth angle characteristics of each of solar radiation detection elements.

In the above configuration, the solar radiation light introduced into the respective solar radiation lens portions 153, 154 is respectively guided to the solar radiation detection elements 151, 152. The solar radiation light detection elements 151, 152 have different azimuth angle characteristics with respect to the solar radiation light. That is, as shown in FIG. 4, the solar radiation detection elements 151, 152 have different outputs with respect to the azimuth angle. Therefore, a difference occurs between outputs of the solar radiation detection element 151, 152 at a specific azimuth angle. The processing circuit of the solar radiation sensor 150 acquires a difference value between the outputs of the solar radiation detection elements 151, 152 and detects the difference value as an amount of solar radiation.

Each of the solar radiation lens portions 153, 154 is integrally molded with the light-guide lens portion 134. That is, the light-guide lens portion 134 and the solar radiation lens portions 153, 154 are formed from one mold. Since the solar radiation lens portions 153, 154 and the light-guide lens portion 134 are integrally molded, it is not necessary to take into design consideration a joint between the solar radiation lens portions 153, 154 and the light-guide lens portion 134. That is, it is easy to design the solar radiation lens portions 153, 154 and the light-guide lens portion 134.

Accordingly, a lens 160 formed in one piece is configured to include the light-guide lens portion 134 and the solar radiation lens portions 153, 154. The lens 160 is accommodated in the cover housing 110 to be positioned above the arrangement surface 121 of the circuit board 120. One surface of the lens 160, opposite to a surface on which the first lens portion 135, the second lens portion 136, and the solar radiation lens portions 153, 154 are formed, has a planar shape.

Further, as shown in FIG. 1, a sheet 170 is attached to a planar portion of the lens 160. The sheet 170 contacts not only the lens 160 but also the windshield 200 as well. The lens 160 takes in light from the windshield 200 through the sheet 170.

The above is an overall configuration of the optical sensor device 100 according to the present embodiment. The detection result of the rain sensor 130 and the detection result of the solar radiation sensor 150 are output to an external device via the connector 122.

Next, a specific configuration of the light-guide lens portion 134 is described. As shown in FIG. 2, the first lens portion 135 of the light-guide lens portion 134 has a plurality of incident portions 137 and 138. The incident portions 137 and 138 correspond to the light-emitting elements 131, 132, respectively, and receive light from the light-emitting elements 131, 132, respectively. In other words, one incident portion 137 and one light-emitting element 131 correspond to each other, and the other incident portion 138 and the other light-emitting element 132 correspond to each other.

The incident portions 137, 138 are provided with equalizing portions 139, 140. The equalizing portions 139, 140 reduce the intensity of light incident along the z direction among the light emitted from the corresponding light-emitting elements 131, 132. Light incident in the z direction includes not only light parallel with a line extending along the z direction, but also light somewhat inclined with respect to the z direction.

Also, each of the equalizing portions 139 and 140 receives part of the light emitted from adjacent elements 131, 132, i.e., elements next to the light-emitting elements 131, 132. Thereby, the equalizing portions 139 and 140 equalize the intensity of the light incident on the light-guide lens portion 134 along the x direction.

Specifically, the equalizing portion 139, one of the two, has a curved portion 141, a flat portion 142, and a light-introducing portion 143. The other equalizing portion 140 has a curved portion 144, a flat portion 145 and a light-introducing portion 146.

Figure 5:
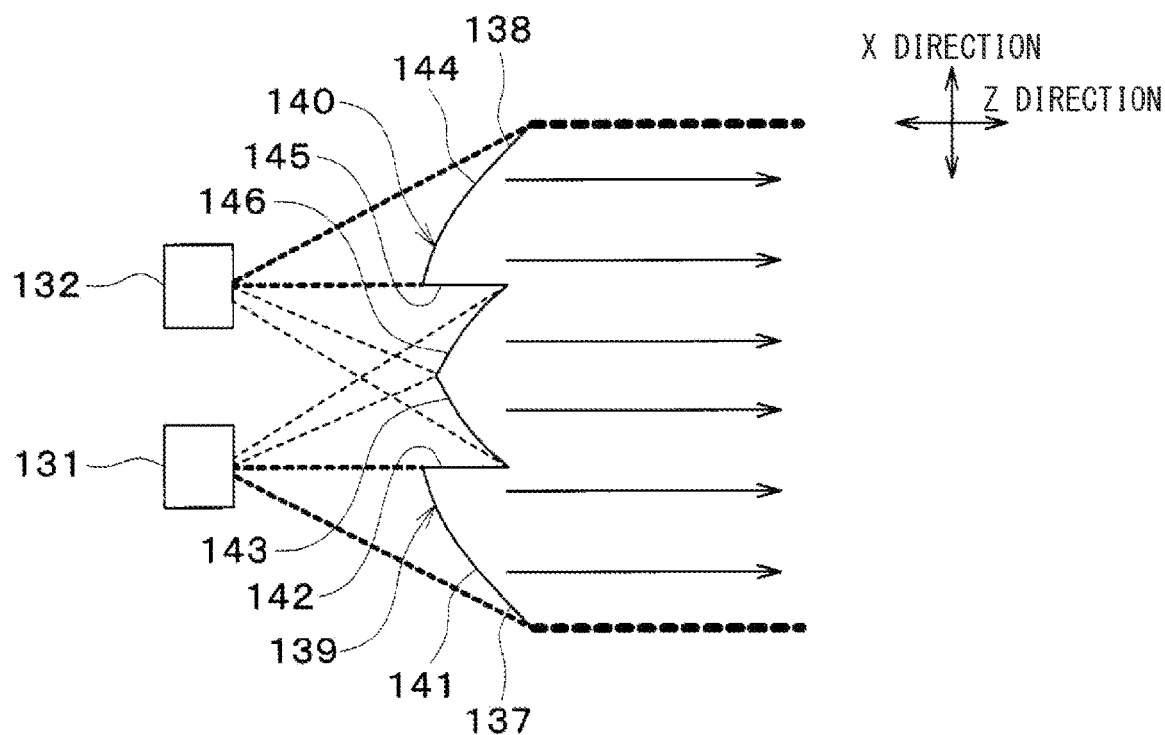
FIG. 5 is a plan view of a first lens portion and each of light-emitting elements of the light-guide lens portion.

As shown in FIG. 5, each of the curved portions 141 and 144 receives light emitted from the corresponding light-emitting elements 131, 132. Each of the curved portions 141 and 144 is a curved lens surface that inclines toward the light-receiving element 133 as it extends away from the adjacent light-emitting elements 131, 132.

Each of the flat portions 142, 145 is a surface extending along the z direction. Each of the flat portions 142, 145 includes not only a plane parallel to the z direction but also a plane slightly inclined with respect to the z direction. The flat portions 142 and 145 are connected to the curved portion 141 and 144, respectively, on one of two sides thereof close to the adjacent light-emitting elements 131 and 132. The flat portions 142 and 145 make it difficult for light along the z direction to enter the light-guide lens portion 134, thereby reducing the intensity of light entering the central portion of the incident portions 137 and 138 in the x direction.

The light-introducing portions 143 and 146 are positioned closer to the adjacent light-emitting elements 131, 132 than the flat portions 142 and 145 in the x direction, respectively. That is, the light-introducing portion 146 is positioned closer to the adjacent light-emitting element 131 than the flat portion 145 in the x direction, and the light-introducing portion 143 is positioned closer to the adjacent light-emitting element 132 than the flat portion 142 in the x direction. Each of the light-introducing portions 143 and 146 is a curved lens surface in which one of two sides thereof close to the adjacent light-emitting elements 131, 132 is positioned closer to the corresponding light-emitting elements 131, 132 than the other side thereof close to the flat portions 142, 145 in the z direction. Each of the light-introducing portions 143, 146 is connected to a light-receiving element 133 side of the flat portions 142, 145. Each of the lighting sections 143 and 146 receives part of the light emitted from the corresponding light-emitting elements 131, 132 and part of the light emitted from the adjacent light-emitting elements 131, 132. That is, the lighting section 143 receives part of the light emitted from the corresponding light-emitting elements 131 and part of the light emitted from the adjacent light-emitting elements 132, and the lighting section 146 receives part of the light emitted from the corresponding light-emitting element 132 and part of the light emitted from the adjacent light-emitting element 131.

Figure 6:
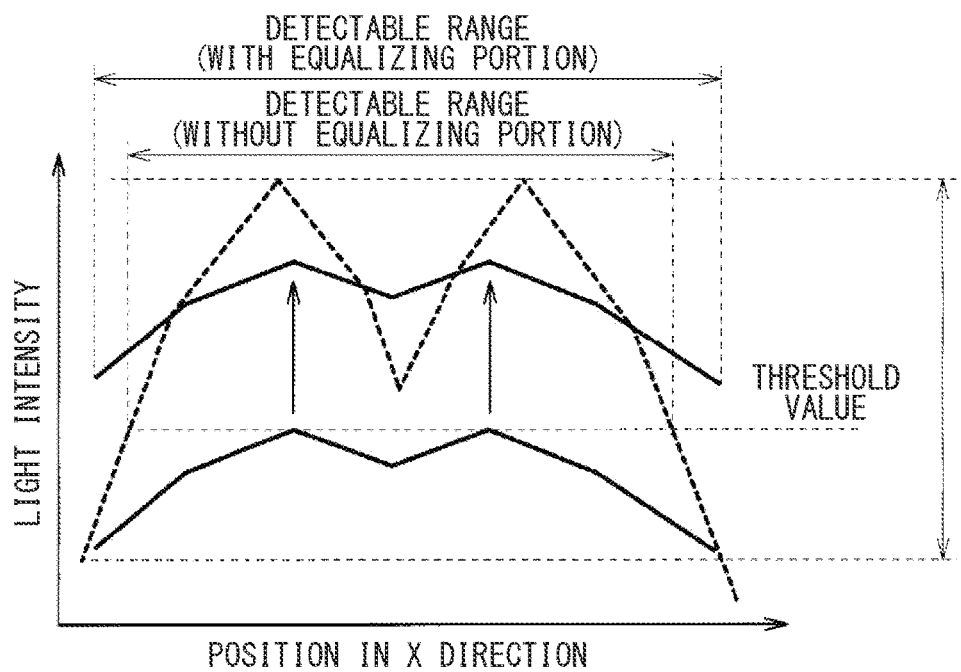
FIG. 6 is a diagram showing a relationship between a position of the light-guide lens portion in the x direction and an intensity of light.

In the first lens portion 135 described above, the intensity of light incident on each of the incident portions 137, 138 is generally increased by each of the equalizing portions 139, 140, as shown in FIG. 6. The two peaks shown in FIG. 6 correspond respectively to the light-emitting elements 131, 132. Since the flat portions 142, 145 extend along the z direction, the light is less likely to enter the light-guide lens portion 134. That is, in the x direction, the flat portions 142, 145 can weaken the intensity of light that tends to enter the central portion of the incident portions 137 and 138.

Further, in the x direction, the light that is difficult to enter one of two end portions of each of the incident portions 137 and 138 close to the adjacent light-emitting elements 131, 132 can be compensated for by the light introduced from the adjacent light-emitting elements 131, 132 through the light-introducing portions 143, 146. As a result, the intensity of the light passing through an inside of the light-guide lens portion 134 is made equalized all along the x direction. Thus, as shown in FIG. 6, the maximum intensity range of the light along the x direction where the intensity of the light exceeds the threshold value for detecting raindrops is increased. Therefore, the detectable range of the rain sensor 130 is widened in the x direction by the equalizing portions 139, 140.

Figure 7:
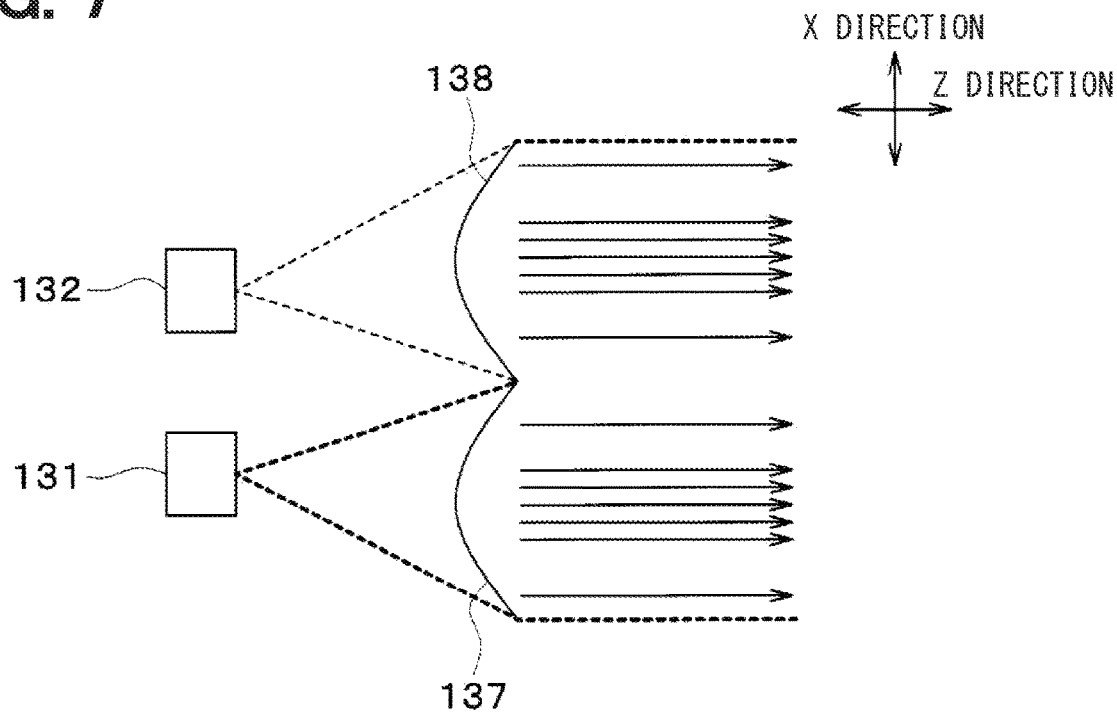
FIG. 7 is a plan view of the first lens portion without having an equalizing portion and each of the light-emitting elements in a comparative example.

In a comparative example, as shown in FIG. 7, when each of the incident portions 137 and 138 has a lens surface without equalizing portions 139 and 140, the light is concentrated in the central portion of each of the incident portions 137 and 138 in the x direction. Therefore, as indicated by a dashed line in FIG. 6, the intensity of light locally increases and the difference between the maximum and minimum values of light intensity increases. Therefore, the detectable range in which the light intensity exceeds the threshold value for detecting raindrops along the x direction becomes narrow.

Next, a specific configuration of each of the solar radiation lens portions 153, 154 is described. As shown in FIG. 2, the solar radiation lens portions 153, 154 have emission surfaces 155, 156 for emitting solar radiation light toward the solar radiation detection elements 151, 152. The emission surface 155, one of the two such surfaces, corresponds to the solar radiation detection element 151, one of the two such elements. Also, the other emission surface 156 corresponds to the other solar radiation detection element 152.

Figure 8:
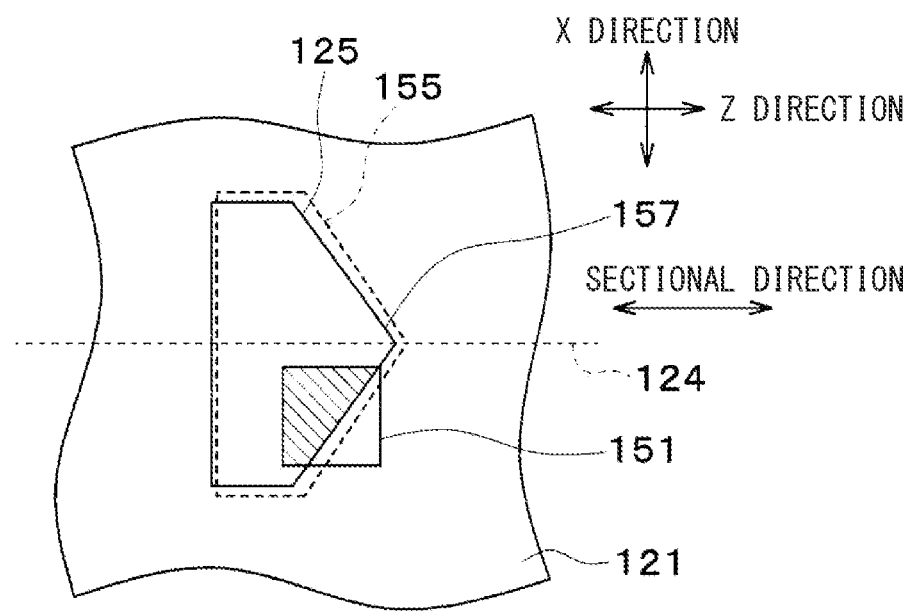
FIG. 8 is a diagram of positions of one of emission surfaces, one of light images, and one of the solar radiation detection elements when an azimuth angle is 0 degree.

In FIG. 8, a sectional direction is defined as an extending direction of a projection line 124 of a section, projected onto the arrangement surface, setting an elevation angle of the solar radiation detection elements 151, 152 against a horizon. The sectional direction corresponds to the z direction.

In FIG. 8, a situation illustrated therein shows positions of (a) the emission surface 155 that is one of the two such surfaces, (b) a light image 125 of the solar radiation light projected onto the arrangement surface 121 of the circuit board 120, and (c) the solar radiation detection element 151 that is one of the two such elements, when the azimuth angle of the solar radiation light is 0 degree, for example. The light image 125 is in a form of light emitted from the emission surface 155. The emission surface 155 and the light image 125 substantially overlap. Therefore, a light-receiving area, which is a portion of the detection surface of the light-receiving element 133, is shown as a hatched portion in FIG. 8. The positions of the other emission surface 156, the light image, and the other solar radiation detection element 152 are similar to those of the above one.

Figure 9:
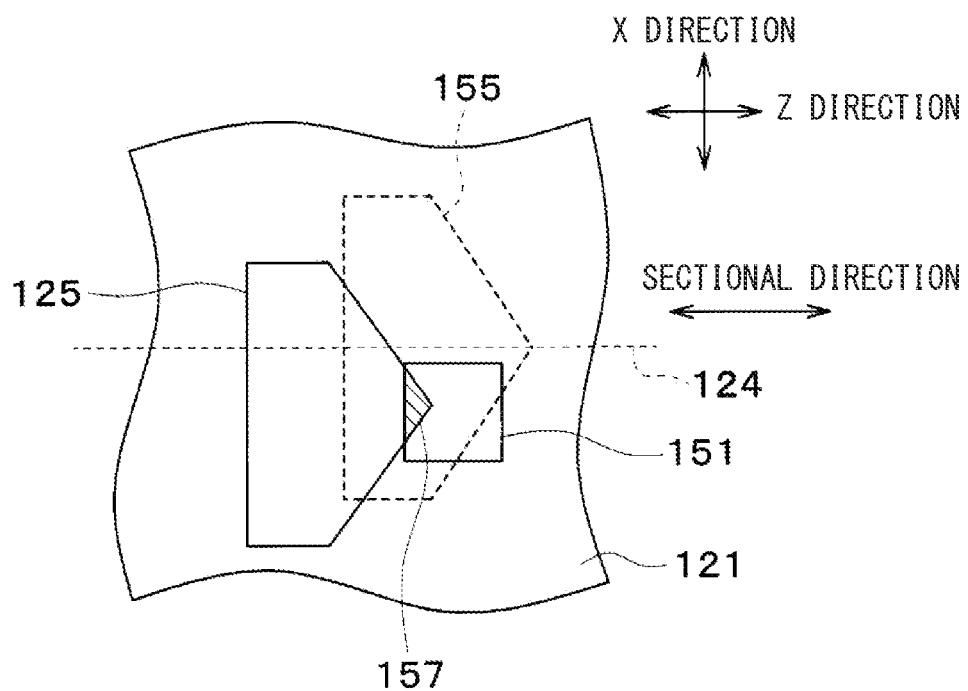
FIG. 9 is a diagram of positions of one of the emission surfaces, one of the light images, and one of the solar radiation detection elements when the azimuth angle is 90 degrees.

Then, as shown in FIG. 2, the emission surfaces 155, 156 have protrusions 157, 158 protruding along the sectional direction, respectively. As shown in FIG. 9, when the azimuth angle of the solar radiation light changes to 90 degrees, for example, the relative position changes between (a) the light image 125 of the solar radiation light projected onto the arrangement surface 121 of the circuit board 120 and (b) the solar radiation detection element 151. Change is also caused in the relative position between (c) the light image emitted from the other light-emitting surface 156 and (d) the other solar radiation detection element 152. That is, the protrusions 157 and 158 both protrude in the sectional direction, e.g., one of two directions indicated by both-headed arrow in FIG. 9, an opposite direction opposite to the one along which the light image 125 of the solar radiation light projected onto the arrangement surface 121 of the circuit board 120 moves away relative to, or from, the solar radiation detection elements 151, 152. The same is true when the azimuth angle of the solar radiation light becomes −90 degrees.

As shown in FIG. 2, the protrusions 157, 158 constitute obtuse corner portions in the planar shape of the emission surfaces 155, 156, respectively, as shown in FIG. 2. In the present embodiment, each of the emission surfaces 155, 156 has a pentagonal planar shape. Specifically, each of the emission surfaces 155, 156 has a pentagonal planar shape obtained by adding a tapered shape to two corners on one side of a square shape of the solar radiation detection elements 151, 152. The pentagonal planar shape includes two 90 degrees corners and three obtuse corners.

According to the projections 157 and 158 and the emission surfaces 155 and 156 described above, even when the light image 125 is moved to the maximum relative distance from the solar radiation detection elements 151, 152 in the sectional direction, a portion of the light image 125 is irradiated onto (i.e., picked up by) the detection surfaces of the solar radiation detection elements 151, 152. That is, as shown in FIG. 9 by a diagonal line portion, even when the light image 125 moves to the maximum distance, portions of the light image 125 corresponding to the projections 157 and 158 are irradiated on the detection surfaces of the solar radiation detection elements 151, 152.

Therefore, even when inexpensive and small solar radiation detection elements 151, 152 are used, a solar radiation detection range equivalent to the case in which the projections 157 and 158 are not provided to the emission surfaces 155, 156 can be obtained. Therefore, even when the solar radiation detection elements 151, 152 of the solar radiation sensor 150 are made inexpensive and miniaturized, deterioration in the detection accuracy of the amount of solar radiation is suppressible.

Figure 10:
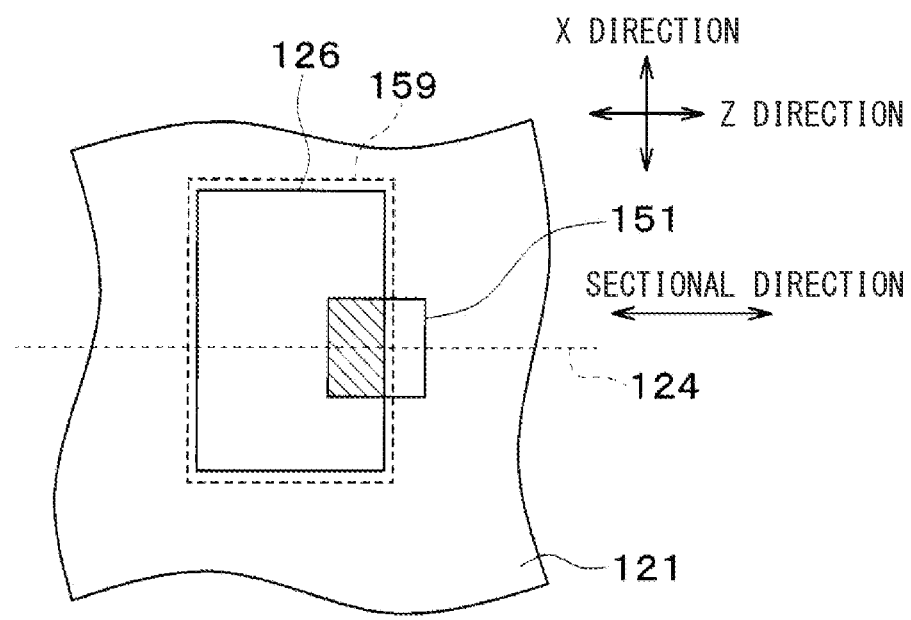
FIG. 10 is a diagram of positions of one of the emission surfaces, one of the light images, and one of the solar radiation detection elements when the emission surface has a square shape and the azimuth angle is 0 degree, in a comparative example.
Figure 11:
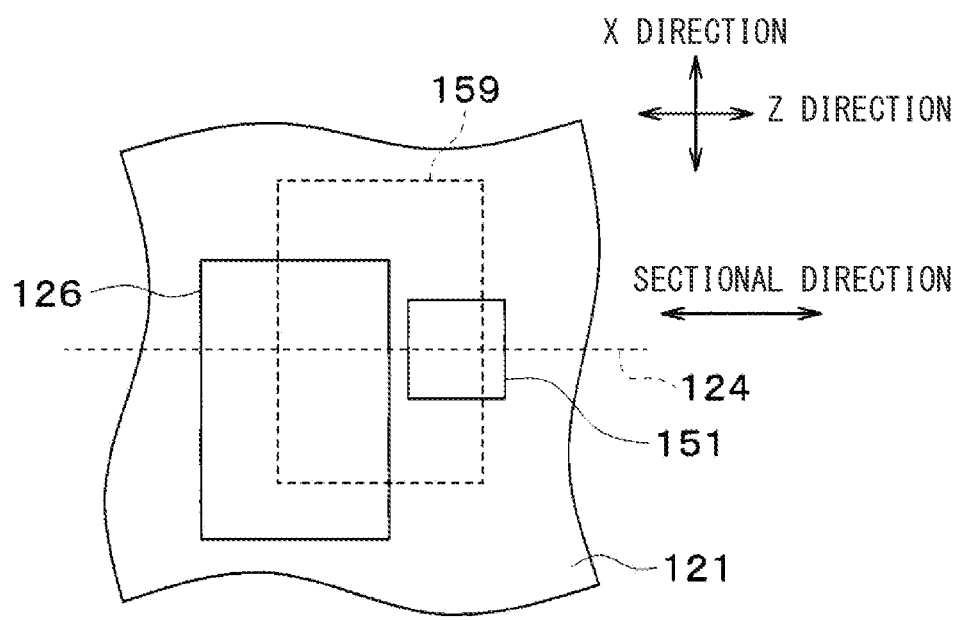
FIG. 11 is a diagram of positions of one of the emission surfaces, one of the light images, and one of the solar radiation detection elements when the emission surface has a square shape and the azimuth angle is 90 degrees, in a comparative example.

As a comparative example, as shown in FIG. 10, when an emission surface 159 is square, for example, with the azimuth angle of the solar radiation light being 0 degree, a square light image 126 is irradiated onto the solar radiation detection elements 151, i.e., onto one of the two such elements. In this case, the emission surface 159 and the light image 126 substantially overlap. However, as shown in FIG. 11, when the light image 126 moves to the maximum distance relative to the solar radiation detection elements 151 in the sectional direction, that is, when the azimuth angle of the solar radiation light is 90 degrees, the light image 126 is not irradiated onto the detection surface of the solar radiation detection elements 151. That is, as shown in FIG. 11 having no diagonal line portion, the detection surface of the solar radiation detection element 151 and the light image 126 do not overlap. The same is true when the azimuth angle of the solar radiation light becomes −90 degrees.

As a modification of the rain sensor 130, in each of the equalizing portions 139 and 140, the pairs of the flat portions 142, 145 and the light-introducing portions 143, 146 are not limited to one pair. Each of the equalizing portions 139, 140 may have plural pairs of flat portions 142, 145 and light-introducing portions 143, 146.

Figure 12:
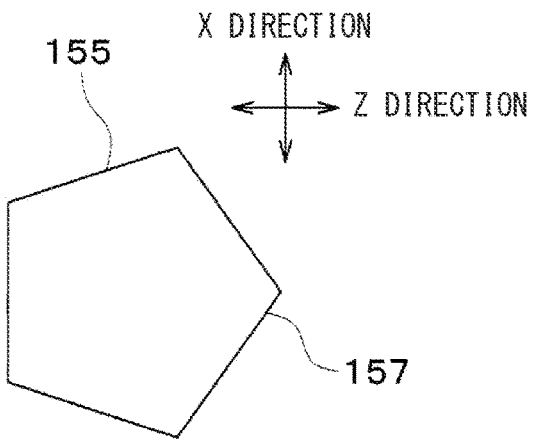
FIG. 12 is a plan view showing an example of a planar shape of each of the emission surfaces as a modification of the solar radiation sensor.
Figure 13:
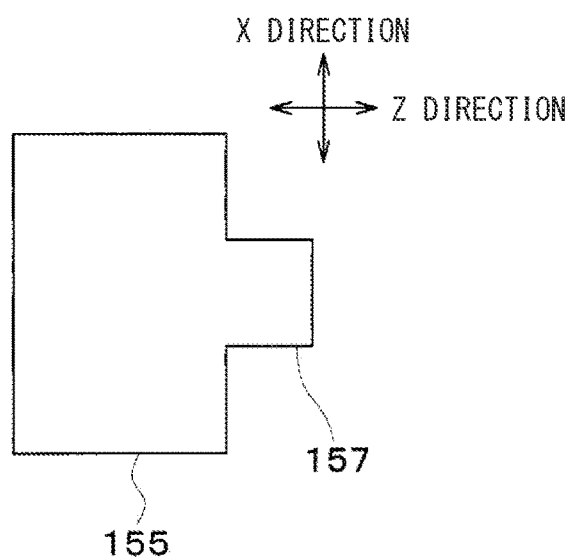
FIG. 13 is a plan view showing an example of a protrusion as a modification of the solar radiation sensor.
Figure 14:
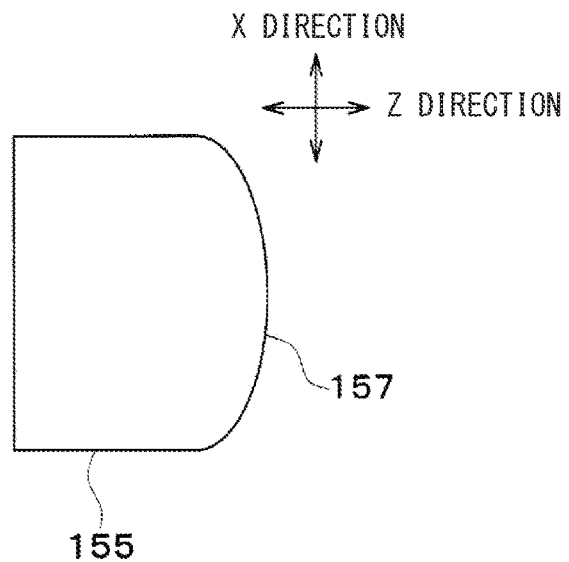
FIG. 14 is a plan view showing an example of the protrusion as an another modification of the solar radiation sensor.
Figure 15:
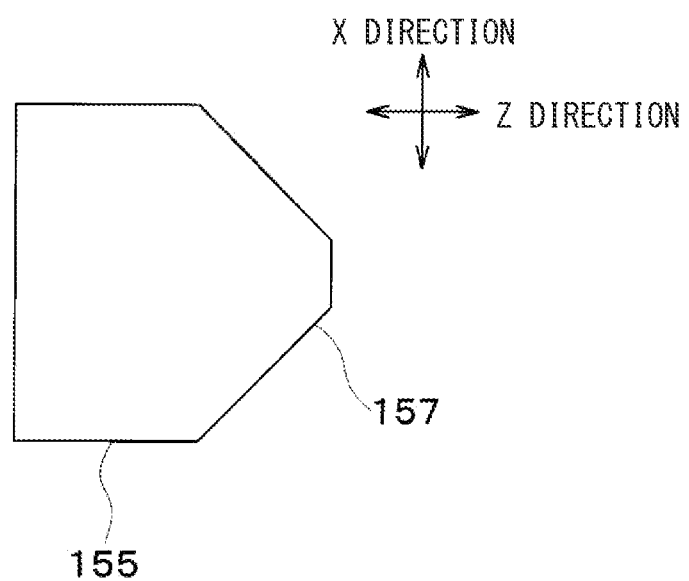
FIG. 15 is a plan view showing an example of the protrusion as an another modification of the solar radiation sensor.
Figure 16:
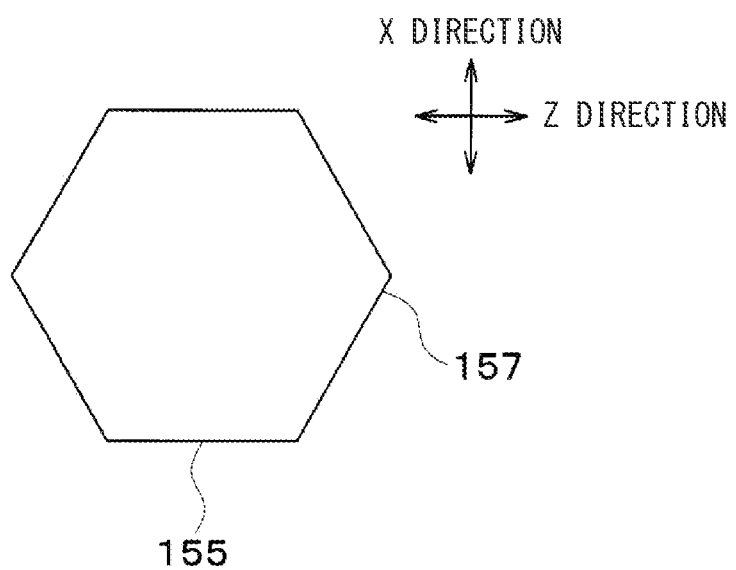
FIG. 16 is a plan view showing an example of the protrusion as an another modification of the solar radiation sensor.

As a modification of the solar radiation sensor 150, as shown in FIG. 12, each of the emission surfaces 155, 156 may have a pentagonal shape with all obtuse corners. As shown in FIG. 13, each of the protrusions 157, 158 may be square in shape. Alternatively, as shown in FIG. 14, each of the protrusions 157, 158 may have a semi-circular shape or a semi-elliptical shape. Alternatively, as shown in FIG. 15, each of the protrusions 157, 158 may have a trapezoidal shape. Alternatively, as shown in FIG. 16, each of the emission surfaces 155, 156 may have a polygonal shape with five or more angles, such as a hexagonal shape. In FIG. 2, each of the emission surfaces 155 and 156 has a pentagonal shape. However, if they are symmetrical with respect to the x direction, each of the emission surfaces 155 and 156 may have a hexagonal shape. In other words, it may be understood that, in FIG. 2, one of two halves of the hexagon shape in the z direction is shown. In FIGS. 12 to 16, though the emission surface 155, that is one of the two such surfaces, is shown, the other emission surface 156 is the same. It may also be possible to make the shape of one emission surface 155 and the shape of the other emission surface 156 different from each other.

The present disclosure is not limited to the embodiments described above, and various modifications can be made as follows within a range not departing from the spirit of the present disclosure. For example, in the optical sensor device 100, the rain sensor 130 and the solar radiation sensor 150 may be configured to be different from an integrated body. That is, the optical sensor device 100 may include only the rain sensor 130, or the optical sensor device 100 may include only the solar radiation sensor 150. Further, the light-guide lens portion 134 and the solar radiation lens portions 153, 154 may be configured to be different from an integrated body.

The number of light-emitting elements included in the rain sensor 130 is not limited to two. The number of light-emitting elements may be three or more. In such case, an equalizing portion is provided for each of the light-emitting elements.

The number of the solar radiation detection elements 151, 152 included in the solar radiation sensor 150 is not limited to two. The number of the solar radiation detection elements may be one.

What is claimed is:

1. An optical sensor device comprising:
a circuit board; and
a rain sensor that includes:
   a plurality of light-emitting elements configured to emit light toward a windshield of a vehicle;
   a light-receiving element configured to receive light reflected by the windshield; and
   a light-guide lens portion configured to guide light emitted from the plurality of light-emitting elements to the windshield, and to guide light reflected by windshield to the light-receiving element, wherein
the rain sensor is configured to detect raindrops adhering to the windshield based on an intensity of light received by the light-receiving element,
the plurality of light-emitting elements are disposed at an arrangement surface that is a surface of the circuit board, and are arranged apart from each other in an x direction perpendicular to a z direction that is a direction connecting an area corresponding to the plurality of light-emitting elements and an area corresponding to the light-receiving element on the arrangement surface,
the light-guide lens portion includes a plurality of incident portions configured to respectively correspond to the plurality of light-emitting elements and to receive incident light from the plurality of light-emitting elements,
the plurality of incident portions are provided with an equalizing portion configured to equalize the intensity of incident light entering to the light-guide lens portion in the x direction, and
the equalizing portion is configured to reduce the intensity of the incident light in the z direction among the light that is emitted from a corresponding light-emitting element of the plurality of light-emitting elements, and to allow an incident of a part of the light emitted from an adjacent light-emitting element adjacent to the corresponding light-emitting element of the plurality of light-emitting elements.

2. The optical sensor device according to claim 1, wherein the equalizing portion includes:
a flat portion extending along the z direction; and
a light-introducing portion that is positioned closer to the adjacent light-emitting element than the flat portion in the x direction and is connected to the flat portion, to receive a part of the light emitted from the adjacent light-emitting element, and the light-introducing portion is a lens surface having one side close to the adjacent light-emitting element and an other side close to the flat portion, and the one side of the lens surface is positioned closer to the corresponding light-emitting element than the other side of the lens surface in the z direction.

3. The optical sensor device according to claim 1, further comprising:

a solar radiation sensor that includes
   a solar radiation detection element configured to receive a solar radiation light incident to the windshield within a predetermined elevation angle range; and
   a solar radiation lens portion configured to guide the solar radiation light incident to the windshield to the solar radiation detection element, wherein
the solar radiation detection element is configured to detect an amount of solar radiation based on an intensity of solar radiation received by the solar radiation detection element,
the solar radiation detection element is arranged on the arrangement surface,
the solar radiation lens portion has an emission surface configured to emit the solar radiation light toward the solar radiation detection element, and
the emission surface includes a protrusion protruding in an extension direction toward a direction opposite to a movement of a light image of the solar radiation light, projected onto the arrangement surface of the circuit board, moving away from the solar radiation detection elements, when the extension direction is defined as a projection line of a cross section taken along a surface configuring an elevation angle of the solar radiation detection elements, projected onto the arrangement surface.

4. The optical sensor device according to claim 3, wherein the protrusion is configured by an obtuse-angled corner in a planar shape of the emission surface.

5. The optical sensor device according to claim 3, wherein the emission surface has a hexagonal planar shape.

6. An optical sensor device comprising:

a solar radiation sensor configured to detect an amount of solar radiation based on an intensity of solar radiation received by a solar radiation detection element that is arranged on a surface of a circuit board; and a rain sensor that includes:
   first and second light-emitting elements configured to emit light toward a windshield of a vehicle;
   a light-receiving element configured to receive light reflected by the windshield; and
   a light-guide lens portion configured to guide light emitted from the first and second light-emitting elements to the windshield, and to guide light reflected by windshield to the light-receiving element, wherein
the rain sensor is configured to detect raindrops adhering to the windshield based on an intensity of light received by the light-receiving element,
the first and second light-emitting elements are disposed on the surface of the circuit board, and are arranged apart from each other in an x direction perpendicular to a z direction that is a direction connecting an area corresponding to the first and second light-emitting elements and an area corresponding to the light-receiving element on the surface of the circuit board,
the light-guide lens portion includes a first incident portion configured to correspond to the first light-emitting elements and a second incident portion configured to correspond to the second light-emitting elements,
the first and second incident portions are provided with an equalizing portion configured to equalize the intensity of incident light entering to the light-guide lens portion in the x direction, and
the equalizing portion is configured to reduce the intensity of the incident light in the z direction among the light that is emitted from the first light-emitting element, and to allow an incident of a part of the light emitted from the second light-emitting element.

* * * * *